(12) United States Patent
Tang et al.

(10) Patent No.: US 11,644,719 B2
(45) Date of Patent: May 9, 2023

(54) LIQUID CRYSTAL DISPLAY PANEL HAVING PAD STRUCTURES AND LIQUID CRYSTAL DISPLAY DEVICE

(71) Applicant: Wuhan China Star Optoelectronics Technology Co., Ltd., Wuhan (CN)

(72) Inventors: Wei Tang, Wuhan (CN); Gaiping Lu, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 16/616,053

(22) PCT Filed: Aug. 21, 2019

(86) PCT No.: PCT/CN2019/101721
§ 371 (c)(1),
(2) Date: Nov. 22, 2019

(87) PCT Pub. No.: WO2020/252887
PCT Pub. Date: Dec. 24, 2020

(65) Prior Publication Data
US 2021/0364842 A1   Nov. 25, 2021

(30) Foreign Application Priority Data
Jun. 17, 2019   (CN) .......................... 201910520498.7

(51) Int. Cl.
*G02F 1/1339*   (2006.01)
*G02F 1/1335*   (2006.01)
*G02F 1/133*    (2006.01)
*G02F 1/03*     (2006.01)

(52) U.S. Cl.
CPC ........ *G02F 1/13394* (2013.01); *G02F 1/0338* (2013.01); *G02F 1/13312* (2021.01); *G02F 1/13318* (2013.01); *G02F 1/13396* (2021.01); *G02F 1/133512* (2013.01); *G02F 1/133514* (2013.01)

(58) Field of Classification Search
CPC combination set(s) only.
See application file for complete search history.

(56) References Cited

U.S. PATENT DOCUMENTS

| | | | |
|---|---|---|---|
| 2013/0050619 A1* | 2/2013 | Kim | G02F 1/13394 430/320 |
| 2014/0092350 A1* | 4/2014 | Byeon | G02F 1/1339 349/155 |
| 2016/0349562 A1 | 12/2016 | Hashimoto | |
| 2017/0075174 A1* | 3/2017 | Lee | G02F 1/1341 |
| 2020/0103690 A1 | 4/2020 | Wu et al. | |

\* cited by examiner

*Primary Examiner* — Lauren Nguyen
(74) *Attorney, Agent, or Firm* — PV IP PC; Wei Te Chung; Ude Lu

(57) ABSTRACT

A liquid crystal display panel includes an array substrate, a color filter substrate, a plurality of pad structures disposed between the array substrate and the color filter substrate, a display area, and a light transmissive functional area. The pad structures are correspondingly disposed on the display area. The display area includes a predetermined area disposed at a periphery of the light transmissive functional area, and a thickness of each of the pad structures disposed on the predetermined area gradually decreases along a direction from the predetermined area to the light transmissive functional area.

5 Claims, 1 Drawing Sheet

LIQUID CRYSTAL DISPLAY PANEL HAVING PAD STRUCTURES AND LIQUID CRYSTAL DISPLAY DEVICE

FIELD OF INVENTION

The present disclosure relates to the field of display technologies, and more particularly to a liquid crystal display panel and a liquid crystal display device.

BACKGROUND OF INVENTION

As people's requirements for aesthetics of electronic devices are getting higher and higher, in-plane boring technologies appear in people's field of vision. However, there are still many issues in the in-plane boring technologies. For example, blind holes are easy to appear strip-shaped interference patterns during optical testings.

SUMMARY OF INVENTION

An embodiment of the present disclosure provides a liquid crystal display panel, which can solve technical problems that current liquid crystal display panels are easy to generate interference patterns at blind holes.

An embodiment of the present disclosure provides a liquid crystal display panel. The liquid crystal display panel includes an array substrate, a color filter substrate, a plurality of pad structures disposed between the array substrate and the color filter substrate, a display area, and a light transmissive functional area. The pad structures are correspondingly disposed on the display area. The display area includes a predetermined area disposed at a periphery of the light transmissive functional area, and a thickness of each of the pad structures disposed on the predetermined area gradually decreases along a direction from the predetermined area to the light transmissive functional area. The pad structures are spaced apart from each other on the display area, and the light transmissive functional area is provided with a camera, a light sensor, or a light emitter.

In an embodiment of the present disclosure, the light transmissive functional area has a circular shape, the predetermined area is annular, and the predetermined area is disposed centrally with the light transmissive functional area.

In an embodiment of the present disclosure, each of the pad structures includes a black matrix layer, a photoresist layer disposed on the black matrix layer, and a pad support layer disposed on the photoresist layer, the black matrix layer is connected to the color filter substrate, and the pad support layer is connected to the array substrate.

In an embodiment of the present disclosure, a width of the black matrix layer of each of the pad structures, a width of the photoresist layer, and a width of the pat support layer are sequentially decreased.

In an embodiment of the present disclosure, the black matrix layers of the pad structures have a same thickness, the photoresist layers of the pad structures have a same thickness, on the predetermined area, a thickness of the pad support layer gradually decreases along the direction of the predetermined area to the light transmissive functional area.

In an embodiment of the present disclosure, on the predetermined area, the thickness of the pad support layer gradually decreases according to a predetermined value along the direction of the predetermined area to the light transmissive functional area.

In an embodiment of the present disclosure, the display area further includes a first display area disposed outside the predetermined area, and the pad structures on the first display area have a same thickness.

An embodiment of the present disclosure further provides a liquid crystal display panel. The liquid crystal display panel includes an array substrate, a color filter substrate, a plurality of pad structures disposed between the array substrate and the color filter substrate, a display area, and a light transmissive functional area. The pad structures are correspondingly disposed on the display area. The display area includes a predetermined area disposed at a periphery of the light transmissive functional area, and a thickness of each of the pad structures disposed on the predetermined area gradually decreases along a direction from the predetermined area to the light transmissive functional area.

In an embodiment of the present disclosure, the light transmissive functional area has a circular shape, the predetermined area is annular, and the predetermined area is disposed centrally with the light transmissive functional area.

In an embodiment of the present disclosure, each of the pad structures includes a black matrix layer, a photoresist layer disposed on the black matrix layer, and a pad support layer disposed on the photoresist layer, the black matrix layer is connected to the color filter substrate, and the pad support layer is connected to the array substrate.

In an embodiment of the present disclosure, a width of the black matrix layer of each of the pad structures, a width of the photoresist layer, and a width of the pat support layer are sequentially decreased.

In an embodiment of the present disclosure, the black matrix layers of the pad structures have a same thickness, the photoresist layers of the pad structures have a same thickness, on the predetermined area, a thickness of the pad support layer gradually decreases along the direction of the predetermined area to the light transmissive functional area.

In an embodiment of the present disclosure, on the predetermined area, the thickness of the pad support layer gradually decreases according to a predetermined value along the direction of the predetermined area to the light transmissive functional area.

In an embodiment of the present disclosure, the display area further includes a first display area disposed outside the predetermined area, and the pad structures on the first display area have a same thickness.

In an embodiment of the present disclosure, the pad structures are spaced apart from each other on the display area.

In an embodiment of the present disclosure, the light transmissive functional area is provided with a camera, a light sensor, or a light emitter.

An embodiment of the present disclosure provides a liquid crystal display device including a liquid crystal display panel. The liquid crystal display panel includes an array substrate, a color filter substrate, a plurality of pad structures disposed between the array substrate and the color filter substrate, a display area, and a light transmissive functional area. The pad structures are correspondingly disposed on the display area. The display area includes a predetermined area disposed at a periphery of the light transmissive functional area, and a thickness of each of the pad structures disposed on the predetermined area gradually decreases along a direction from the predetermined area to the light transmissive functional area.

In an embodiment of the present disclosure, the light transmissive functional area has a circular shape, the predetermined area is annular, and the predetermined area is disposed centrally with the light transmissive functional area.

In an embodiment of the present disclosure, each of the pad structures includes a black matrix layer, a photoresist layer disposed on the black matrix layer, and a pad support layer disposed on the photoresist layer, the black matrix layer is connected to the color filter substrate, and the pad support layer is connected to the array substrate.

In an embodiment of the present disclosure, a width of the black matrix layer of each of the pad structures, a width of the photoresist layer, and a width of the pat support layer are sequentially decreased.

Beneficial effects of an embodiment of the present disclosure are that, the liquid crystal display panel and the liquid crystal display device provided by the embodiment of the present disclosure gradually reduces the thickness of each of the pad structures in the vicinity of the light transmissive functional area, thereby preventing interference patterns from occurring in the light transmissive functional area, thereby improving display performance.

DESCRIPTION OF DRAWINGS

The accompanying figures to be used in the description of embodiments of the present disclosure or prior art will be described in brief to more clearly illustrate the technical solutions of the embodiments or the prior art. The accompanying figures described below are only part of the embodiments of the present disclosure, from which figures those skilled in the art can derive further figures without making any inventive efforts.

DETAILED DESCRIPTION OF PREFERRED EMBODIMENTS

Figure 1:
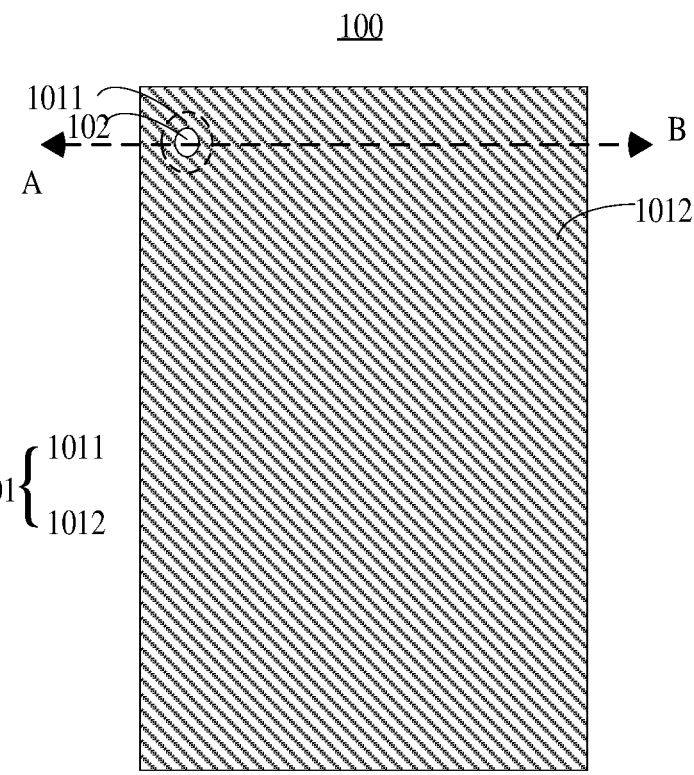
FIG. 1 is a schematic structural view of a liquid crystal display panel according to an embodiment of the present disclosure.

The embodiments of the present disclosure are described in detail below, and the examples of the embodiments are illustrated in the drawings, wherein the same or similar reference numerals are used to refer to the same or similar elements or elements having the same or similar functions. The embodiments described below with reference to the accompanying drawings are intended to be illustrative and are not to be construed as limiting.

In the description of the present disclosure, it is to be understood that the terms "center", "longitudinal", "transverse", "length", "width", "thickness", "upper", "lower", "front", "back", "left", "right", "vertical", "horizontal", "top", "bottom", "inside", "outside", "clockwise", "counterclockwise", etc. are an orientation or positional relationship of indications based on an orientation or positional relationship illustrated in the drawings, this is merely for the convenience of describing the present disclosure and the simplified description, this does not indicate or imply that the device or component referred to has a specific orientation, and this is constructed and operated in a specific orientation. Therefore, it should not be construed as limiting the present disclosure. Moreover, the terms "first" and "second" are used for descriptive purposes only and are not to be construed as indicating or implying a relative importance or implicitly indicating the number of technical features indicated. Therefore, features defining "first" or "second" may include one or more of the described features either explicitly or implicitly. In the description of the present disclosure, the meaning of "a plurality" is two or more unless specifically and specifically defined otherwise.

Figure 2:
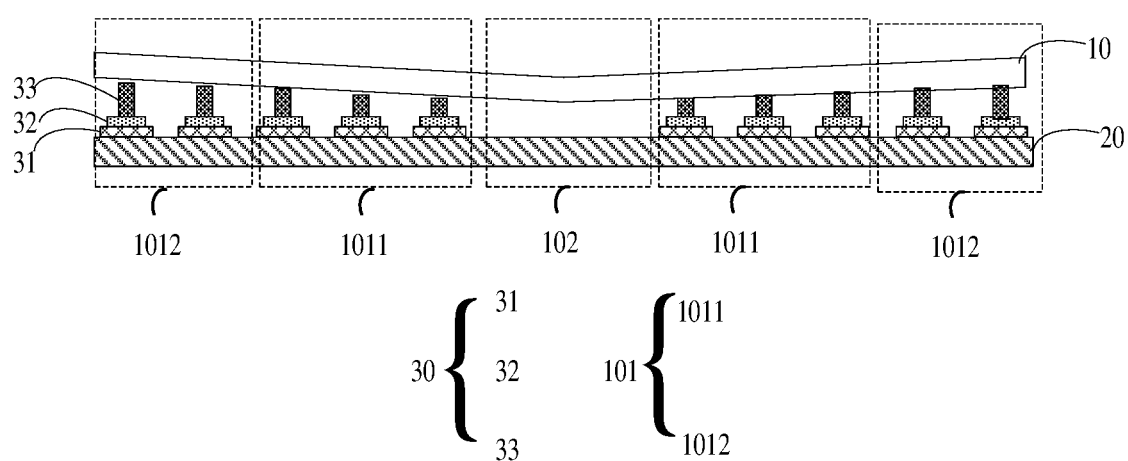
FIG. 2 is a schematic cross-sectional view of the liquid crystal display panel illustrated in FIG. 1 taken along a line A-B.

Referring to FIG. 1 and FIG. 2, FIG. 1 is a schematic structural view of a liquid crystal display panel according to an embodiment of the present disclosure, and FIG. 2 is a schematic cross-sectional view of the liquid crystal display panel illustrated in FIG. 1 taken along a line A-B. As illustrated in FIG. 1 and FIG. 2, a liquid crystal display panel 100 includes an array substrate 10, a color filter substrate 20, a liquid crystal layer (not shown), and a plurality of pad structures 30. The liquid crystal layer is disposed between the array substrate 10 and the color filter substrate 20. The pad structures 30 are disposed between the array substrate 10 and the color filter substrate 20.

The liquid crystal display panel 100 has a display area 101 and a light transmissive functional area 102. The pad structures 30 are correspondingly disposed on the display area 101. That is, the liquid crystal display panel 100 of the embodiment of the present disclosure only provides the pad structures 30 at the position corresponding to the display area 101, and the pad structures 30 are not disposed at the position corresponding to the light transmissive functional area 102. In an embodiment, the pad structures 30 may be spaced apart on the display area 101, such that the pad structures 30 are uniformly disposed at various positions of the liquid crystal display panel 100.

It is noted that the light transmissive functional area 102 in the embodiment of the present disclosure forms a blind hole at the corresponding array substrate 10 and the color filter substrate 20. That is, the array substrate 10 and the color filter substrate 20 on the light transmissive functional area 102 retain only the glass substrate.

In an embodiment, the light transmissive functional area 102 is provided with a camera, a light sensor, or a light emitter, and the light transmissive functional area 102 is used for collecting light from a camera, a light sensor, or a light emitter disposed under the light transmissive functional 102. It is understood that, the present disclosure is not limited to this.

The liquid crystal layer can be correspondingly disposed at the display area 101. It can be understood that, in an embodiment, the light transmissive functional area 102 can also be provided with a liquid crystal layer, the liquid crystal layer at the light transmissive functional region 102 is transparent when daylighting is required, and the liquid crystal layer at the light transmissive functional area 102 is opaque when no daylighting is required.

In the liquid crystal display panel 100 of the embodiment of the present disclosure, the display area 101 includes a predetermined area 1011 disposed at a periphery of the light transmissive functional area 102. A thickness of each of the pad structures 30 disposed on the predetermined area 1011 gradually decreases along a direction from the predetermined area 1011 to the light transmissive functional area 102. That is, the liquid crystal display panel 100 of the embodiment of the present disclosure gradually reduces the thickness of each of the pad structures 30 near the light transmissive functional area 102, thereby avoiding generation of interference patterns at the light transmissive functional area 102, thereby improving display performance.

In one embodiment, on the predetermined area 1011, the thickness of each of the pad structures 30 is uniformly reduced along the direction from the predetermined area 1011 to the light transmissive functional area 102. In another embodiment, on the predetermined area 1011, the thickness of each of the pad structures 30 gradually decreases along a predetermined value from the predetermined area 1011 to the light transmissive functional area 102. The predetermined value may be set according to specific needs, no restrictions here. That is, the liquid crystal display panel 100 implemented in the embodiment of the present disclosure can improve smoothness in the vicinity of the light transmissive functional area 102 and avoid interference patterns.

It can be understood that the light transmissive functional area 102 can have a circular shape, and correspondingly, the predetermined area 1011 has an annular shape. That is, the predetermined area 1011 is disposed centrally with the light transmissive functional area 102, and a radius of the predetermined area 1011 is greater than a radius of the light transmissive functional area 102. In details, a difference between the radius of the predetermined area 1011 and the radius of the light transmissive functional area 102 is greater than three times a pitch of adjacent two pad structures 30 and may be five times or six times the pitch of adjacent two pad structures 30 to increase a number of the pad structures 30 having a thickness gradient therebetween, thereby enhancing smoothness of the pad structures 30.

It can be noted that, in some embodiments, the light transmissive functional area 102 may also have an elliptical shape, a rectangular shape, or a racetrack shape, and the shape of the corresponding predetermined area 1011 is the same as the shape of the light transmissive functional area 102, and the centers of the two coincide. It can be noted that, the present disclosure is not limited to this.

In details, referring to FIG. 2, both ends of each of the pad structures 30 are respectively connected to the array substrate 10 and the color filter substrate 20. Each of the pad structures 30 includes a black matrix layer 31, a photoresist layer 32, and a pad support layer 33. The photoresist layer 32 is disposed on the black matrix layer 31, the pad support layer 33 is disposed on the photoresist layer 32, the black matrix layer 31 is connected to the color filter substrate 20, and the pad support layer 33 is connected to the array substrate 10.

Further, the photoresist layers 32 on the black matrix layer 31 are all in a flat column shape, and the pad support layer 33 has a truncated cone shape that is large in top and small in bottom. The black matrix layer 31, the photoresist layer 32, and the pad support layer 33 of each pad structure 30 are coaxially disposed. That is, a width of the black matrix layer 31 of each of the pad structures 30, a width of the photoresist layer 32, and a width of the pad support layer 33 are sequentially decreased.

In one embodiment, the black matrix layer 31 has a thickness of 0.08 mm to 0.11 mm, the photoresist layer 32 has a thickness of 0.05 mm to 0.10 mm, and the pad support layer 33 has a thickness of 0.23 mm to 0.25 mm. It can be understood that, the present disclosure is not limited to this, and other preferred thickness combinations may be employed.

In the liquid crystal display panel 100 of the embodiment of the present disclosure, thicknesses of the black matrix layers 31 of the pad structures 30 are same, and thicknesses of the photoresist layers 32 of the pad structure 30 are same. On the predetermined area 1011, the thickness of the support layer 33 gradually decreases along the direction from the predetermined area 1011 to the light transmissive functional area 102. That is, the liquid crystal display panel 100 of the embodiment of the present disclosure avoids interference patterns at the light transmissive functional area 102 by gradually reducing the thickness of the pad support layer 33 in the pad structure 30 near the light transmissive functional area 102, thereby improving display performance.

In one embodiment, on the predetermined area 1011, the thickness of the pad support layer 33 in the pad structure 30 is uniformly reduced along the direction from the predetermined area 1011 to the light transmissive functional area 102. In another embodiment, on the predetermined area 1011, the thickness of the pad support layer 33 in the pad structures 30 gradually decreases according to a predetermined value from the predetermined area 1011 to the light transmissive functional area 102, The predetermined value can be set according to specific needs and is not limited herein. That is, the liquid crystal display panel 100 implemented in the embodiment of present disclosure can improve the smoothness in the vicinity of the light transmissive functional area 102 and avoid interference patterns.

In addition, it should be noted that the display area 101 further includes a first display area 1012 disposed outside the predetermined area, and each of the pad structures 30 has the same thickness on the first display area 1012. That is, in the pad structure disposed on the first display area, the thickness of the black matrix layer 31 of each pad structure 30 is the same, the thickness of the photoresist layer 32 of each pad structure 30 is the same, and the thickness of the pad support layer 33 of each pad structure 30 is the same.

An embodiment of the present disclosure also provides a liquid crystal display device including the liquid crystal display panel described above. The liquid crystal display device provided by the embodiment of the present disclosure can reduce the thickness of the pad structure in the vicinity of the light transmissive functional area, thereby generating interference patterns at the blind holes that are light transmissive and improving display performance.

In the description of the present specification, the description with reference to the terms "one embodiment", "some embodiments", "illustrative embodiment", "example", "specific example", or "some examples", etc. is the description of the various features, structures, materials or features described in connection with the embodiments or examples included in at least one embodiment or example of the present disclosure. In the present specification, the schematic representation of the above terms does not necessarily mean the same embodiment or example. Furthermore, the particular features, structures, materials, or characteristics described may be combined in a suitable manner in any one or more embodiments or examples.

In summary, although the preferable embodiments of the present disclosure have been disclosed above. It should be noted that those of ordinary skill in the art can make a variety of improvements and substitutions on the premise of not deviating from the technical principle of the present disclosure, and these improvements and substitutions should be encompassed within the protection scope of the present disclosure.

What is claimed is:

1. A liquid crystal display panel, comprising an array substrate, a color filter substrate, and a plurality of pad structures disposed between the array substrate and the color filter substrate, and further comprising:
   a light transmissive functional area having a circular shape and provided with a camera, a light sensor, or a light emitter, wherein the pad structures are not disposed in the light transmissive functional area; and
   a display area comprising a predetermined area disposed around the light transmissive functional area and having an annular shape, and a first display area disposed around the predetermined area, wherein the pad structures are disposed in the display area and are spaced apart from each other, the pad structures in the first display area have a same thickness, and thicknesses of the pad structures in the predetermined area gradually decrease in all directions from the predetermined area to the light transmissive functional area;

wherein each of the pad structures comprises a black matrix layer, a photoresist layer disposed on the black matrix layer, and a pad support layer disposed on the photoresist layer, when the liquid crystal display panel is flat, the black matrix layer is connected to the color filter substrate, the pad support layer is connected to the array substrate, the color filter substrate is flat, and a part of the array substrate in the predetermined area gradually bends toward the color filter substrate in the directions from the predetermined area to the light transmissive functional area.

2. The liquid crystal display panel according to claim 1, wherein the predetermined area is disposed centrally with the light transmissive functional area, and a difference between an radius of the predetermined area and an radius of the light transmissive functional area is greater than three times a pitch of two adjacent pad structures.

3. The liquid crystal display panel according to claim 1, wherein a width of the black matrix layer of each of the pad structures, a width of the photoresist layer, and a width of the pat support layer are sequentially decreased.

4. The liquid crystal display panel according to claim 3, wherein the black matrix layers of the pad structures have a same thickness, the photoresist layers of the pad structures have a same thickness, and in the predetermined area, a thickness of the pad support layer gradually decreases in the direction from the predetermined area to the light transmissive functional area.

5. The liquid crystal display panel according to claim 4, wherein in the predetermined area, the thickness of the pad support layer gradually decreases according to a predetermined value in the direction from the predetermined area to the light transmissive functional area.

* * * * *